(12) United States Patent
Takahashi et al.

(10) Patent No.: US 7,323,840 B2
(45) Date of Patent: Jan. 29, 2008

(54) MAGNETIC-POLE DETECTING SYSTEM FOR SYNCHRONOUS AC MOTOR AND MAGNETIC-POLE DETECTING METHOD THEREFOR

(75) Inventors: Kazutaka Takahashi, Chiyoda-Ku (JP); Yasunobu Harada, Chiyoda-Ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 555 days.

(21) Appl. No.: 10/495,078

(22) PCT Filed: Feb. 7, 2002

(86) PCT No.: PCT/JP02/01036

§ 371 (c)(1),
(2), (4) Date: Oct. 19, 2004

(87) PCT Pub. No.: WO03/067748

PCT Pub. Date: Aug. 14, 2003

(65) Prior Publication Data

US 2005/0052175 A1    Mar. 10, 2005

(51) Int. Cl.
*H02P 7/00* (2006.01)

(52) U.S. Cl. ............... 318/280; 318/138; 318/254; 318/432; 318/434; 318/439; 318/283; 318/286

(58) Field of Classification Search ............ 318/138, 318/254, 432–434, 439, 280–286, 700–800
See application file for complete search history.

(56) References Cited

U.S. PATENT DOCUMENTS 4,706,005 A * 11/1987 Iwako .................. 318/603

(Continued)

FOREIGN PATENT DOCUMENTS

JP    04252371 A    9/1992

(Continued)

*Primary Examiner*—Lincoln Donovan
*Assistant Examiner*—Tyrone Smith
(74) *Attorney, Agent, or Firm*—Sughrue Mion, Pllc.

(57) ABSTRACT

A magnetic-pole detecting system for synchronous AC motors and a magnetic-pole detecting method therefor are provided. The magnetic-pole detecting system for synchronous AC motors includes a position detector 10 for detecting the relative position between the moving element 3 and the stator of an AC motor 5; a phase-update command unit 52 for making a plurality of currents with different phases flow in coils 3a and 3b so that the moving element 3 moves to a plurality of stable points; a reversal command unit 56 for making currents flow in the coils 3a and 3b so that the moving element 3 reverses from the previous direction in which the moving element 3 has been moved by the phase-update command unit 52; a current cut-off command unit 54 for cutting off the currents flowing in the coils 3a and 3b when the position-detector 10 detects a movement of the moving element 3; a reversal-determining unit 64 for determining, based on a position-detecting signal from the position-detector 10, a direction in which the moving element has moved based on the phase-update command unit 52, and for determining that the determined direction has reversed between the previous and the present instances; and a stable-point-simulator for simulating a stable point by means of the phase of the currents flowing in the moving element 3 when the reversal-determining unit 64 has detected the reversal.

15 Claims, 6 Drawing Sheets

U.S. PATENT DOCUMENTS

| | | | |
|---|---|---|---|
| 5,144,564 A * | 9/1992 | Naidu et al. | 318/721 |
| 5,463,293 A * | 10/1995 | Matsui | 318/285 |
| 6,501,243 B1 * | 12/2002 | Kaneko et al. | 318/700 |
| 6,906,491 B2 * | 6/2005 | Matsuo et al. | 318/722 |
| 6,992,488 B2 * | 1/2006 | Lin | 324/438 |
| 7,075,266 B2 * | 7/2006 | Tobari et al. | 318/807 |
| 7,166,975 B2 * | 1/2007 | Mori et al. | 318/254 |
| 7,170,283 B2 * | 1/2007 | Toyozawa et al. | 324/207.25 |

FOREIGN PATENT DOCUMENTS

| | | |
|---|---|---|
| JP | 8-214600 A | 8/1996 |
| JP | 11-55996 A | 2/1999 |

* cited by examiner

MAGNETIC-POLE DETECTING SYSTEM FOR SYNCHRONOUS AC MOTOR AND MAGNETIC-POLE DETECTING METHOD THEREFOR

TECHNICAL FIELD

This invention relates to magnetic-pole detecting systems for synchronous AC motors (referred to as a magnetic-pole detecting system, hereinafter) and magnetic-pole detecting methods therefor, and more particularly, to improvement in initial magnetic-pole detection.

BACKGROUND ART

In a synchronous AC motor, magnetic-pole position needs to be detected in order to determine the phase of the current that flows in each phase coil. For this purpose, magnetic-pole detecting systems in which magnetic-pole position is detected by making each phase current flow in a certain pattern so that the moving element moves to a corresponding stable point are known.

A conventional magnetic-pole detecting system as mentioned above will be described referring to Japanese Laid-Open Patent Publication 1991-89886. According to the patent publication, a magnetic-pole detecting system detects initial magnetic-pole position by changing the phases of an α-phase current $I_\alpha$ and a β-phase current $I_\beta$—which flow in an α-phase coil and a β-phase coil that are formed in the moving element of a 2-phase AC motor—to phases opposite the direction of movement, corresponding to distance traveled by the moving element, so that the moving element moves to a desired stable point.

That is to say, the magnetic-pole position is detected by making the α-phase current $I_\alpha$ and the β-phase current $I_\beta$ of equation (4) and (5) described in the foregoing patent publication flow in the α-phase coil and the β-phase coil, so that a predetermined force F (equation (6) described in the above patent publication) is exerted on the moving element so as to move the moving element to a stable point where the force exerted on the moving element is zero.

In such cases, the travel distance ΔX that the moving element moves is given by the following equation (equation (8) in the above patent publication):

$$\Delta X = (\tau/4 - X)/(1+K) \text{ wherein}$$

X is the position of the moving element;

τ is the magnetic-pole pitch; and K is a feedback constant when feedback is implemented.

According to this equation, since the travel distance ΔX of the moving element can be reduced approximately in inverse proportion to the feedback constant K, the travel distance ΔX can be shortened by setting the feedback constant K to a larger value.

In this situation, since the moving element is made to move to the stable point by feeding back the position of the moving element, the moving element becomes oscillatory in the vicinity of the stable point, and this oscillation is intensified by setting the feedback constant to a large value. Therefore, by providing, as set forth in the above patent publication, a phase compensator, the oscillation is damped by compensating, in correspondence with the moving speed of the moving element, the current phases, which vary depending on the moving amount that the moving element moves.

However, in the conventional magnet-pole detecting system, in order to inhibit the oscillation of the moving element, a speed detector for detecting the travel speed of the moving element and a phase compensator for compensating the current phases in correspondence with the travel speed of the moving element must be provided, and furthermore the speed feedback value of the moving element has to be adjusted, and thus there has been a problem in that the magnetic-pole detecting system is complex.

DISCLOSURE OF INVENTION

The present invention is made to address the foregoing issues and has an object of providing a simplified magnet-pole detecting system and a magnet-pole detecting method therefor that employ an open-loop control system not requiring feedback of the position, the speed, and the like of the moving element, and moreover that shorten the distance that the moving element travels to a stable point, and damp the oscillation of the moving element caused by the control system.

There is provided a magnetic-pole detecting system according to the first aspect, including:

a synchronous AC motor having phase coils either in a moving element or in a stator;

a position-detecting means for generating a position-detecting signal to detect positional relationship between the moving element and the stator;

a movement-determining means for generating a movement signal upon determining that the moving element has moved, based on the position-detecting signal from the position-detecting means;

a current command generating means for generating a first current command signal for making a plurality of different-phase currents flow so that the moving element moves to a plurality of stable points, and for generating a second current command signal that makes currents flow, the currents having a phase that makes the moving element move in reverse to the direction in which the moving element has moved based on the first current command signal; a current controlling means for making the currents flow in the phase coils, based on the first and the second current command signals;

a current cut-off means for cutting off the currents flowing in the phase coils, based on the movement signal from the movement-determining means;

a reversal-determining means for determining, based on a detection value from the position-detecting means, the direction in which the moving element has moved based on the first current command signal, and for determining that the detected direction has reversed between previous and present instances; and a stable-point simulating means for simulating the position of the moving element by means of the stable point determined by the phase of the first current command signal when the reversal-determining means has detected a reversal, or by the phase prior to the phase at the reversal.

With the magnetic-pole detecting system, the current command generating means generates the first current command signal having a plurality of different-phase currents so that the moving element moves to a plurality of stable points; the currents are, based on the first current command signal, made to flow into the phase coils by means of the current controlling means; the position-detecting means detects the movement of the moving element; and the current cut-off means cuts off the currents flowing in the phase coils. When the reversal-determining means determines that the direction, in which the moving element has moved based on the first current command signal, has reversed between the previous and the present instances, the stable-point simulating means simulates the position where the moving element is at a standstill by means of the stable point determined by the phase of the first current command signal upon the reversal or by the phase prior to the phase upon the reversal; therefore, the stable point of the moving element can be detected by means of a makeup of the open-loop control system without feeding back the position, the speed, or the like of the moving element.

Therefore, in the magnetic-pole detecting system according to the present aspect, since, unlike the conventional art, no moving-element oscillation caused by feedback of a position or the like occurs when the moving element is made to move to a stable point, the oscillation of the moving element can substantially be damped. In addition, since it is detected that the moving element has moved and then the current cut-off means cuts off the currents flowing in the phase coils, in detecting a stable point of the moving element, the travel distance of the moving element can be shortened. Therefore, an effect is demonstrated wherein a simplified magnet-pole detecting system can be obtained.

There is provided a magnetic-pole detecting method according to the second aspect, including:
- a first step of making, by means of the current controlling means, currents with a first phase flow in the phase coils, so that the moving element moves, based on the first current command signal, to a first stable point;
- a second step of cutting off the currents by means of a current cut-off means, when a movement-determining means detects, based on the position-detecting signal, a movement of the moving element;
- a third step of making, based on the second current command signal, currents with a second phase flow in the phase coils, by means of the current controlling means, so that the moving element reverses from a direction in which the moving element has moved;
- a fourth step of cutting off the currents by means of the current cut-off means when the movement of the moving element is detected by the movement-determining means;
- a fifth step of making the phase of the first current command signal the phase for a second stable point that is different from the phase for the first stable point, and of making the currents flow in the phase coils by means of the current controlling means;
- a sixth step of determining, based on the position-detecting signal from the position-detecting means, a direction in which the moving element moves based on the first current command signal, and for determining whether or not the detected direction has reversed between the previous and the present instances;
wherein the first step through the sixth step are sequentially carried out, and the stable point, determined by the phase of the first current command signal when the reversal-determining means has detected a reversal, or by the phase prior to the phase at the reversal, is simulated as the position of the moving element by a stable-point simulating means.

With the magnetic-pole detecting method, a position-detecting means detects that the moving element has moved; the current cut-off means cuts off the currents flowing in the phase coils; and the reversal-determining means detects that the moving direction of the moving element has reversed between the previous and the present instances. Accordingly, with the magnetic-pole detecting method according to the present aspect, since, unlike the conventional art, no moving-element oscillation caused by feedback of a position or the like occurs when the moving element is made to move to a stable point, a simplified device that substantially damps the oscillation of the moving element can be obtained. In addition, since the current cut-off means immediately cuts off currents in the moving element, an effect is demonstrated wherein, in detecting a stable point of the moving element, a travel distance of the moving element can be shortened.

There is provided the magnetic-pole detecting system according to the third aspect, including: a cut-off signal generating means for generating a current cut-off command signal when a predetermined time period elapses from the occurrence of a first or a second current command signal; wherein the current cut-off means cuts off currents in the phase coils, based on the current cut-off command signal from the cut-off signal generating means.

In the present aspect, "a previous moving direction in the reversal-determining means" denotes an immediately prior moving direction in which the moving element has been moved by making currents flow into the phase coils by means of a first current command signal, when the moving element remains still even when the first current command signal makes the currents flow into the phase coils.

With the magnetic-pole detecting system, an effect is demonstrated wherein a position of the moving element can be detected simply even when the moving element halts at a point where attractive force on the moving element is zero.

There is provided the magnetic-pole detecting system according to the fourth aspect, including: a current-maintaining means, provided in place of the stable-point-simulating means, for inactivating the current cut-off means based on the determination, by the reversal-determining means, that the reversal has occurred, and for continuing to make the currents with the phase at the reversal or currents with the phase prior to the phase at the reversal flow into the phase coils, until the moving element is determined, based on the detecting signal from the position-detecting means, to have come to a standstill.

According to the magnetic-pole detecting system, since the current-maintaining means continues to make the currents with the phase at the reversal, or the phase prior to the phase at the reversal, flow in the phase coils until, based on the position-detecting signal from the position-detecting means, the moving element is detected to have come to a standstill, the moving element is certain to be moved to a stable point. As a result, an effect is demonstrated wherein the accuracy of detecting a stable point of the moving element is raised.

In the magnetic-pole detecting system according to the fifth aspect, the current phase of the first or the second current command signal is a phase at which sinusoidal cogging torque generated in the synchronous AC motor is approximately zero.

With the magnetic-pole detecting system, an effect is demonstrated wherein the detecting a stable point of the moving element is unsusceptible to the cogging torque generated by the synchronous AC motor.

There is provided the magnetic-pole detecting system according to the sixth aspect, including:
- a phase-updating means for updating the phase of the first current command signal in steps of $\Delta\theta$;
- a standstill-determining means for generating a standstill signal upon determining that the moving element has come to a standstill, based on the position-detecting signal from the position-detecting means, after the currents are made to flow into the phase coils by the first current command signal;

a first position-calculating means for obtaining a first position equal to the first stable point, based on the first phase of the first current command signal upon the occurrence of the standstill signal;

a second position-calculating means for obtaining a second position equal to the second stable point, based on the second phase of the first current command signal when the reversal-determining means has made a determination; and a stable-point calculating means for obtaining, based on the first and the second positions, the position of the stable point; wherein the current controlling means maintains the phase of the movable element when at a standstill, even when the currents are made to flow in the phase coils, according to the first current command signal.

Since the magnet-pole detecting system has a means for compensating, based on the first and the second positions, the position of a stable point, an effect is demonstrated wherein the stable-point fluctuation caused by frictional force between the moving element and a stator can be suppressed.

There is provided the magnetic-pole detecting system according to the seventh aspect, wherein currents generated by the current controlling means have a time constant longer than that determined from the resistance component and the inductance component of the AC motor.

With the magnetic-pole detecting system, an effect is demonstrated wherein an inertial travel distance of the moving element can be shortened since currents flowing in the synchronous AC motor rise smoothly, and attractive force on the moving element increases gradually.

BEST MODE FOR CARRYING OUT THE INVENTION

Explanation of Position-Detecting Principle for Moving Element

Figure 1:
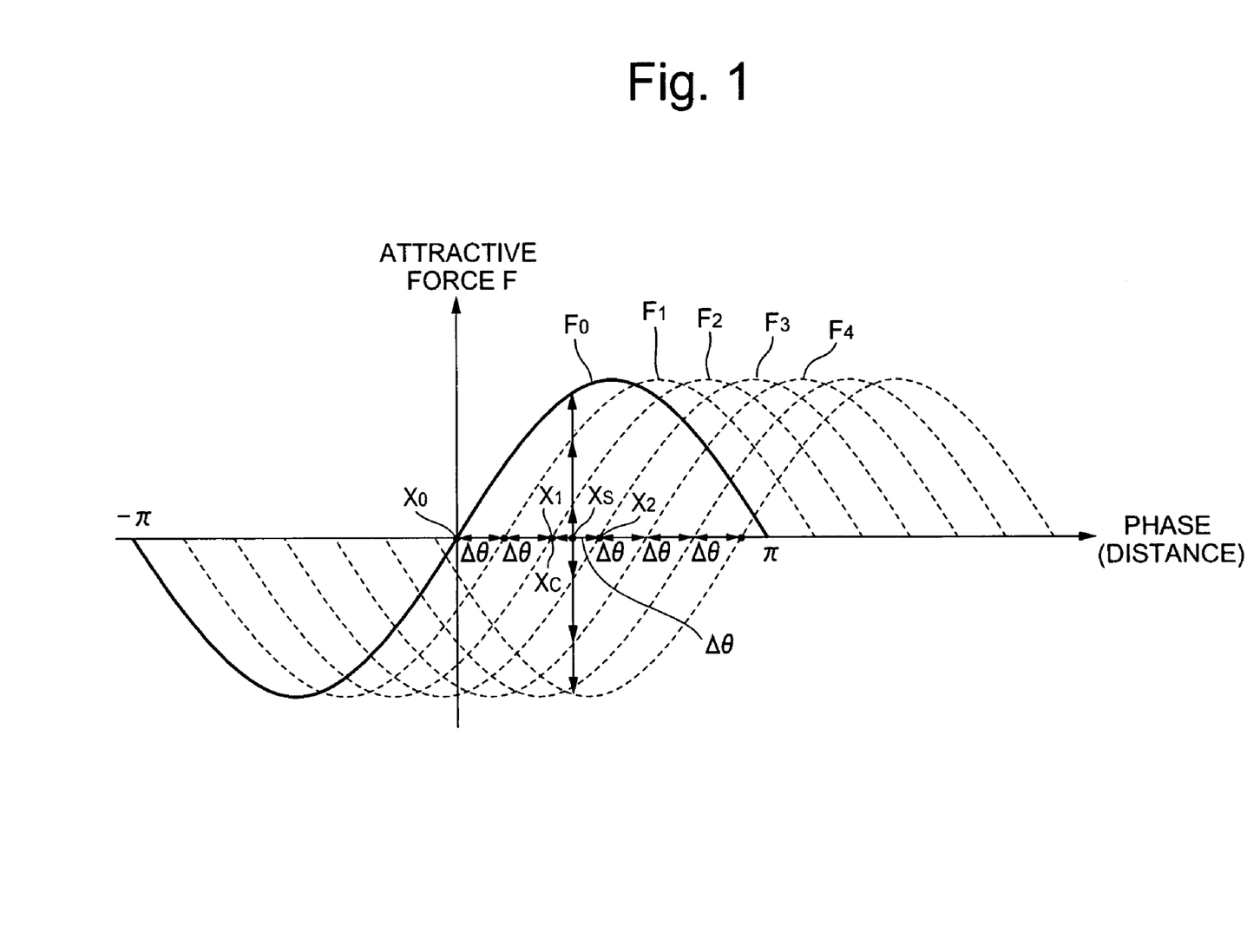
FIG. 1 is a characteristic curve chart for moving element attractive torque vs. phase (distance), representing the principle of moving-element position detection according to an embodiment of the present invention.

A principle for detecting moving-element position by means of a magnetic-pole detecting system according to the present invention will be described referring to FIG. 1. FIG. 1 is a characteristic curve chart for moving-element attractive torque vs. phase (distance), representing the principle of moving-element position detection.

(1) Fundamental Principle

In a synchronous AC motor comprising a moving element having 2-phase coils—an α-phase coil and a β-phase coil—and a stator, when a current with a phase of $-n\Delta\theta$ flows in each of the α-phase coil and the β-phase coil based on an electric current command signal, with an attractive force F acting on the moving element and a stable-point position X for the moving element, the following equation is obtained:

$$F = A \cdot I_c \sin(\Pi/2 - n\Delta\theta) + B \cdot I_c \sin(-n\Delta\theta) \qquad (1), \text{wherein}$$

$$A: \phi \cdot \cos(2\Pi X/\tau + 2\Pi \Delta X/\tau)$$

$$B: \phi \cdot \cos(2\Pi X/\tau + 2\Pi \Delta X/\tau + \Pi/2)$$

τ: magnetic-pole pitch (m)

Rearranging equation (1), the attractive force F is expressed as in the following equation:

$$F = \phi \cdot I_c \cdot \cos(2\Pi X/\tau + 2\Pi \Delta X/\tau + n\Delta\theta) \qquad (2)$$

The moving element is presently at a standstill in a position $X_S$ as shown in FIG. 1, and in terms of the above equation (2), when the phase $n\Delta\theta$ of the current $I_c$ is varied, the curve chart for the attractive force F vs. the phase will be as represented in FIG. 1. In other words, when the phase $n\Delta\theta$ is varied in steps of $\Delta\theta$, the attractive force changes from $F_0$, to $F_1$, $F_2$ and so forth.

The positive-direction attractive forces $F_0$, $F_1$ and $F_2$ are exerted on the moving element until the phase reaches $2\Delta\theta$, and the moving element moves in the positive direction; however, after the phase reaches $3\Delta\theta$, a negative-direction attractive force $F_3$ is exerted on the moving element, and the moving element reversely moves in the negative direction. It can be determined that the moving element is present between the phase $2\Delta\theta$ and the phase $3\Delta\theta$ by detecting this reversal by means of a positional signal from the position-detecting system in the moving element; that is, the position of the moving element can be detected.

However, if this type of position detection is insufficiently accurate, when reversal of the moving-element is detected, by keeping a current of phase $3\Delta\theta$ when the reversal occurs, or of phase $2\Delta\theta$ prior to the reversal, flowing in the α-phase coil and in the β-phase coil until the moving element 3 comes to a standstill so as to shift the moving element 3 to position $X_1$ or $X_2$, the position of the moving element can be detected with a high degree of accuracy.

In cases where the moving element is moved in this way, if the maximal value $\Delta X_{max}$ of the travel distance of the moving element is to be found from the conditions under which the attractive force F is zero, i.e., the above equation (2) is zero, the following equation will hold:

$$2\Pi X/\tau + 2\Pi \Delta X_{max}/\tau + n\Delta\theta = \Pi/2 \Delta X_{max} = \tau/4 - X - (n\Delta\theta/2\Pi)\tau \qquad (3)$$

Consequently, after detecting that the position of the moving element is within a predetermined range, the accuracy of moving-element position detection can be improved by shifting the moving element by a minimally necessary distance.

(2) Return of the Moving Element to its Former Position

Keeping the currents of phase $n\Delta\theta$ flowing in the α-phase and the β-phase coils would not be appropriate, since the moving element would move to the position where the attractive force F is zero (the stable point), prolonging the travel distance of the moving element. In order to avert this, when the moving element shifts, the currents that flow in the α-phase and the β-phase coils are cut off, based on a position-detecting signal from the moving-element position-detecting system, so that the attractive force on the moving element is zero, and the moving element is kept from shifting.

However, after the moving element has moved, even with the attractive force of the moving element equal to zero, the moving element slows with natural deceleration speed determined by the kinetic friction coefficient and the like of the moving element, and comes to a standstill after coasting, for example, for several micrometers. In order to address this, after the moving element has moved in reverse, with the currents of phase nΔθ+Πbeing made to flow in the α-phase and the β-phase coils, by cutting off the currents that flow in the α-phase and the β-phase coils, based on a position-detecting signal from the position-detecting system, and by returning the moving element to its former position, the halting position of the moving element does not shift.

(3) Position Detection when Moving Element is Halted at Point $X_c$ at which Attractive Force F is zero.

The foregoing has described a situation wherein the moving element is halted at positions other than those where the attractive force F is zero. However, on rare occasions, the position (stable point) where the attractive force F of the moving element is zero may coincide with a standstill position of the moving element. For instance, when the moving element is at a standstill at the position $X_c$, the stable point of the moving element resulting from the attractive force $F_2$ coincides with the position $X_c$ of the moving element. Therefore, when the attractive force $F_2$ resulting from the phase 2Δθ occurs, since no attractive force is exerted on the moving body, leaving the moving body at a standstill, no moving direction for the moving body exists. Therefore, after a predetermined time period following the issuance of a current command that makes the currents flow in the α-phase and β-phase coils, e.g., after 100 ms, the currents in the α-phase and the β-phase coils are cut off, and then with the phase of the current that flows in the α-phase and β-phase coils updated by one to a phase of 3Δθ, the moving element is made to move toward a new stable point $X_2$. In this way, movement of the moving element is ensured.

The determination of a reverse movement of the moving element is implemented by varying, in steps of Δθ, the phase of the currents flowing in the α-phase and the β-phase coils and determining that the moving element has reversed between the previous instance and the present instance. However, in the case of the 2Δθ phase current, since the moving element has been at a standstill, there is no previous moving direction. Therefore, when the moving element has been halted in the previous instance in this way, the moving direction of the moving element in the instance before the previous instance is employed as the previous instance. In other words, a reverse movement is determined by taking the moving direction of the moving element directly before as the moving direction of the previous instance.

Moreover, since the moving element may also be halted at a position $X_0$, currents whose nΔθ phase exceeds 2Πare made to flow in the α-phase and β-phase coils, whereby the moving element is made to reverse for certain.

EMBODIMENT 1

Figure 2:
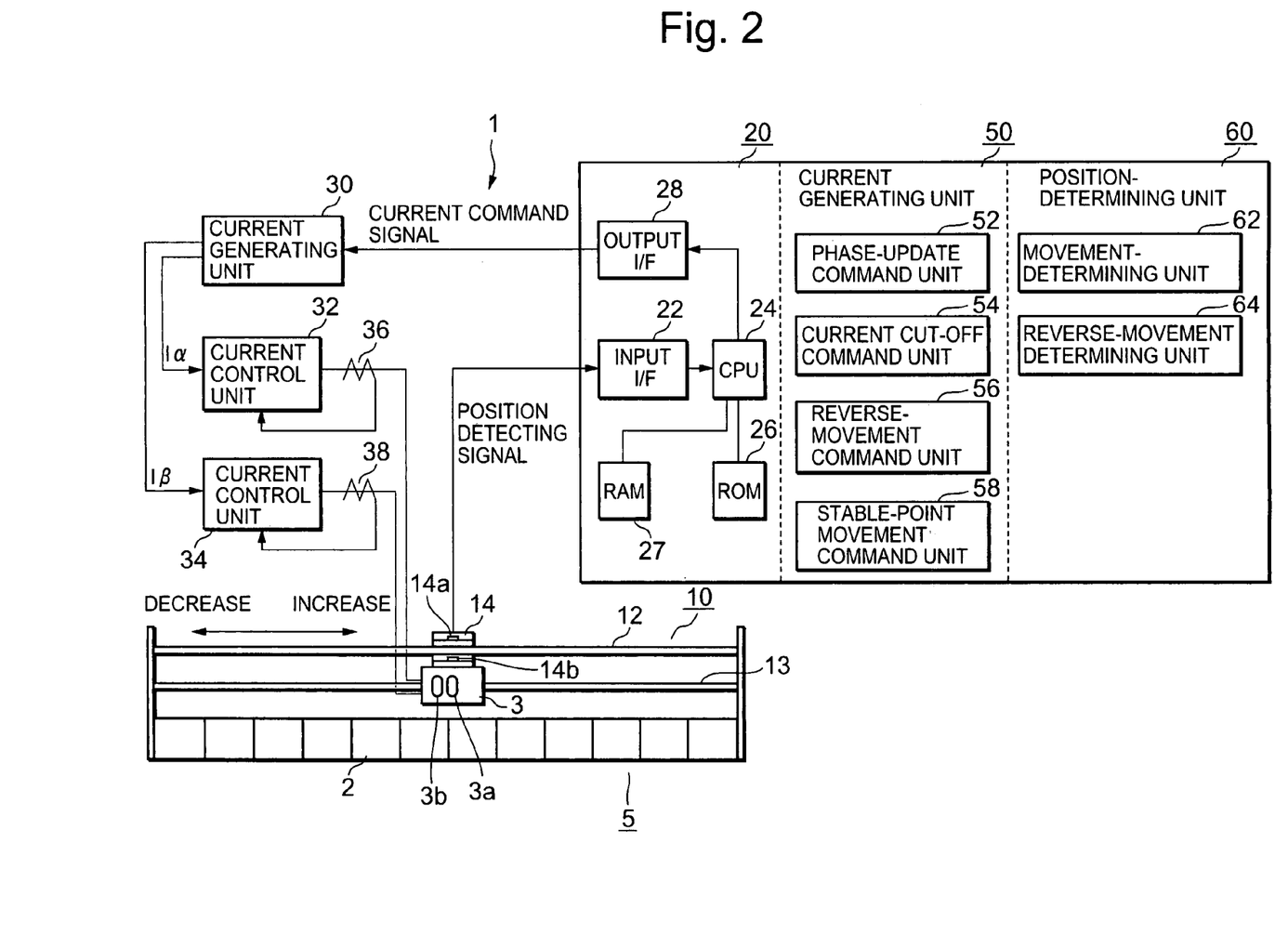
FIG. 2 is an overall block diagram of a magnetic-pole detecting system for an AC motor, illustrating an embodiment of the present invention.

An embodiment of the present invention that implements the foregoing position-detecting principle for a moving element is set forth referring to FIG. 2. FIG. 2 is an overall block diagram of a magnetic-pole detecting system in a synchronous AC motor.

In FIG. 2, a magnetic-pole detecting system 1 is equipped with a 2-phase, linear synchronous AC motor 5 (referred to as an AC motor, hereinafter) that has a stator 2 and comprises a moving element 3 with an α-phase coil 3a and a β-phase coil 3b, each phase coil being arranged facing, and having a predetermined gap with, the stator 2; a position detector 10 that detects the position of the moving element 3; a microcomputer 20 that generates an electric current command signal for making currents flow in the AC motor 5 and that executes predetermined processes based on position-detecting signals from the position detector 10; a current generating unit 30 that is connected to the output of microcomputer 20 and, based on the current command signal from the microcomputer 20, that applies or cuts off currents in the coils 3a and 3b; current control units 32 and 34 that are connected to outputs of the current generating unit 30 and that control currents from the current generating unit 30 so that they flow in the coils 3a and 3b; and Ts 36 and 38 that detect currents inputted into the current control units 32 and 34 and flowing in the coils 3a and 3b.

The position detector 10 functions as a position-detecting means for detecting, as a position-detecting signal, the position of the moving element 3 relative to the stator 2, and is equipped with a linear scale 12 that is horizontally extended across a travel region of the moving element 3, and that has positional information for detecting that the moving element 3 has moved horizontally; a light-emitting unit 14a that is arranged so as to partially surround the linear scale 12 and that generates light by means of a light emitting diode; a light receiving unit 14b that receives the light through a phototransistor; and a concave shape detecting unit 14 fixed on the surface of the moving element 3. In addition, a linear guide 13 is extended in parallel to the stator 2 so that the moving element 3 moves horizontally with respect to the stator 2.

The microcomputer 20, wherein the output from the detecting unit 14 of the position detector 10 is connected to an input interface (referred to as "I/F" hereinafter) 22, comprises a CPU 24, a ROM 27, a RAM 27, and an output I/F 28 that is connected to the input of the current generating unit 30.

An electric current command unit 50 illustrated in the form of a block diagram, indicating the functions of the microcomputer 20, is provided with a phase-update command unit 52 that generates a forward-movement current command signal with different phases (the first current command signal) so that the moving element 3 can move to a plurality of stable points; a current cut-off command unit 54 that generates a current cut-off command signal that cuts off currents flowing in the coils 3a and 3b; a reversal command unit 56 that generates a reversal-movement current command signal (the second current command signal) for applying currents in the coils 3a and 3b so that the moving element 3 reverses, relative to the previous instance based on the forward-movement current command signal from the phase-update command unit 52; and a stable-point movement command unit 58 that, when a stable point of the moving element 3 is detected to be within a predetermined range, repeatedly generates the current command signal with a particular phase until the moving element 3 comes to a standstill, and is configured in such a way that a command signal from only one among the phase-update command unit 52, the current cut-off command unit 54, the reversal command unit 56 and the stable-point movement command unit 58 is given to the current generating unit 30.

In addition, a current-command means comprises the phase-update command unit 52 and the reversal command unit 56; a current control means comprises the current generating unit 30 and the current control units 36 and 38; a current cut-off means comprises the current cut-off command unit 54 and the current generation unit 30; a current continuation means comprises the stable-point movement command unit 58, the current generating unit 30 and the current control units 36 and 38.

A position-determining unit 60 illustrated in the form of a block diagram, indicating functions of the microcomputer 20, is provided with a movement-determining unit 62 (a movement-determining means and a standstill-determining means) that, based on a predetermined change in a position-detecting signal originating from the position detector 10, generates a movement signal as the moving element 3 moves from a standstill, and that generates a standstill signal as the moving element 3 comes to a standstill from a movement; and a reverse-movement determining unit 64 (a reverse movement-determining means) that determines that the moving element 3 has reversed between the previous and the present movements and generates a reverse signal based on the determination.

The reverse-movement determining unit 64 determines that the moving element 3 has reversed between the previous and present instances, by determining, based on a position-detecting signal from the position detector 10, the direction in which the moving element 3 has moved based on a normal-movement-current command signal from the phase-update command unit 52. More concretely, using the fact that, when the moving element 3 moves in the right-hand direction in FIG. 1, the positional value of the moving element 3 increases based on the position-detecting signal, and when the moving element 3 moves in the left-hand direction in FIG. 1, the positional value of the moving element 3 decreases based on the position-detecting signal, it is determined that the moving element 3 has moved forward when the difference between the previous and the present positional values increases, and it is determined that the moving element 3 has reversed between the previous and the current movements when the difference decreases. Moreover, the reverse-movement determining unit 64, in cases wherein the moving element 3 has been at a standstill at the previous instance, determines a reverse movement by regarding the direction in which the moving element 3 has moved immediately before as the previous moving direction.

In addition, the reverse-movement determining unit 64 is arranged so as not to detect as a reverse movement a case where the moving element has reversed based on a reverse-movement current command signal from the reverse movement command unit 56. This is because the reversal in such cases is not related to detecting the position of the moving element 3.

Assuming $\Delta\theta$ as a current phase, and n as the number of operations that shift the moving element 3 in a certain direction, e.g., that the number of operations in the right-hand direction in FIG. 1 is n, the phase-update command unit 52 generates the forward-movement current command signal, while updating the phase in steps of $\Delta\theta$, so as to make currents of phase $-n\Delta\theta$ (n is a positive integer) flow in the coils 3a and 3b. In this way, the configuration enables a plurality of different phase currents to flow, so that the moving element 3 can move to a stable point corresponding to the current phase $-n\Delta\theta$, in other words, so that the moving element 3 can move to a plurality of stable points.

Such a phase, $\Delta\theta$, indicates the detection accuracy for the stable points of the moving element 3, and if the load angle of the AC motor 5 is, for example, a maximal value $\pm 10$ degrees, the phase $\Delta\theta$ is set as 10 degrees. If currents that flow, based on the forward-movement current command signal from the phase-update command unit 52, in the coils 3a and 3b are indicated with $I_\alpha$ and $I_\beta$, respectively and if $I_c$ is the maximal current of $I_\alpha$ and $I_\beta$ in their steady states, the following equations are obtained:

$$I_\alpha = I_c(1-\epsilon^{-ct}) \cdot \cos(-n\Delta\theta) \tag{4}$$

$$I_\beta = I_c(1-\epsilon^{-ct}) \cdot \sin(-n\Delta\theta) \tag{5, wherein}$$

n: the number of operations of the moving element in a certain direction
c: time constant (second)
t: time period (second).

The reason why the first-order lag current $I_c(1-\epsilon^{-ct})$, which has predetermined gradient over a time period as in the above equations (1) and (2), is made to flow in the coils 3a and 3b is to limit the distance that the moving element 3 inertially travels, between the time the moving element 3 starts moving and the time the currents flowing in the moving element 3 are cut off. In other words, the currents grow in such a manner that they have a time constant longer than that determined by the resistance component and the inductance component of the AC motor 5; and, when a step voltage is applied to the AC motor 5, the current is delayed by a time constant, for example, of the order of several microseconds, and the delay is prolonged by a time constant of the order of several milliseconds, by making the currents with the first-order-lag flow in the coils 3a and 3b.

The current cut-off command unit 54 is configured so as to generate the above current cut-off command signal by detecting, based on the position-detecting signal from the position detector 10, that the moving element 3 has moved according to the current command signal (including both forward-movement current command signal and reverse-movement current command signal), or that the moving element 3 has not moved even when the predetermined time has elapsed after the issuance of the current command signal.

The reverse movement command unit 56 generates a reverse-movement current command signal so that the currents flow in the coils 3a and 3b of the moving element 3 according to the equations below, and, based on this reverse-movement current command signal, returns the moving element 3 to its initial position by moving the moving element 3 opposite to the previous direction of movement. This is because the exact position of the moving element 3 cannot be detected when the moving element 3 moves.

$$I_\alpha = I_c(1-\epsilon^{-ct}) \cdot \cos(-n\Delta\theta+\Pi) \tag{6}$$

$$I_\beta = I_c(1-\epsilon^{-ct}) \cdot \sin(-n\Delta\theta+\Pi) \tag{7}$$

The stable-point movement command unit 58 inactivates the current cut-off command unit 54 based on the determination by the reverse-movement determining unit 64 that the moving element 3 has reversed, and continues to generate a current command signal until it is detected, based on the position-detecting signal from the position detector 10, that the moving element 3 has come to a standstill, by generating, for the coils 3a and 3b, a current command signal of phase $n\Delta\theta$, which occurs with reverse movement, or of phase $-(n-1)\Delta\theta$, which occurs one step before that at which reverse movement occurs, and conveying this current command signal to the current generating unit 30.

Figure 3:
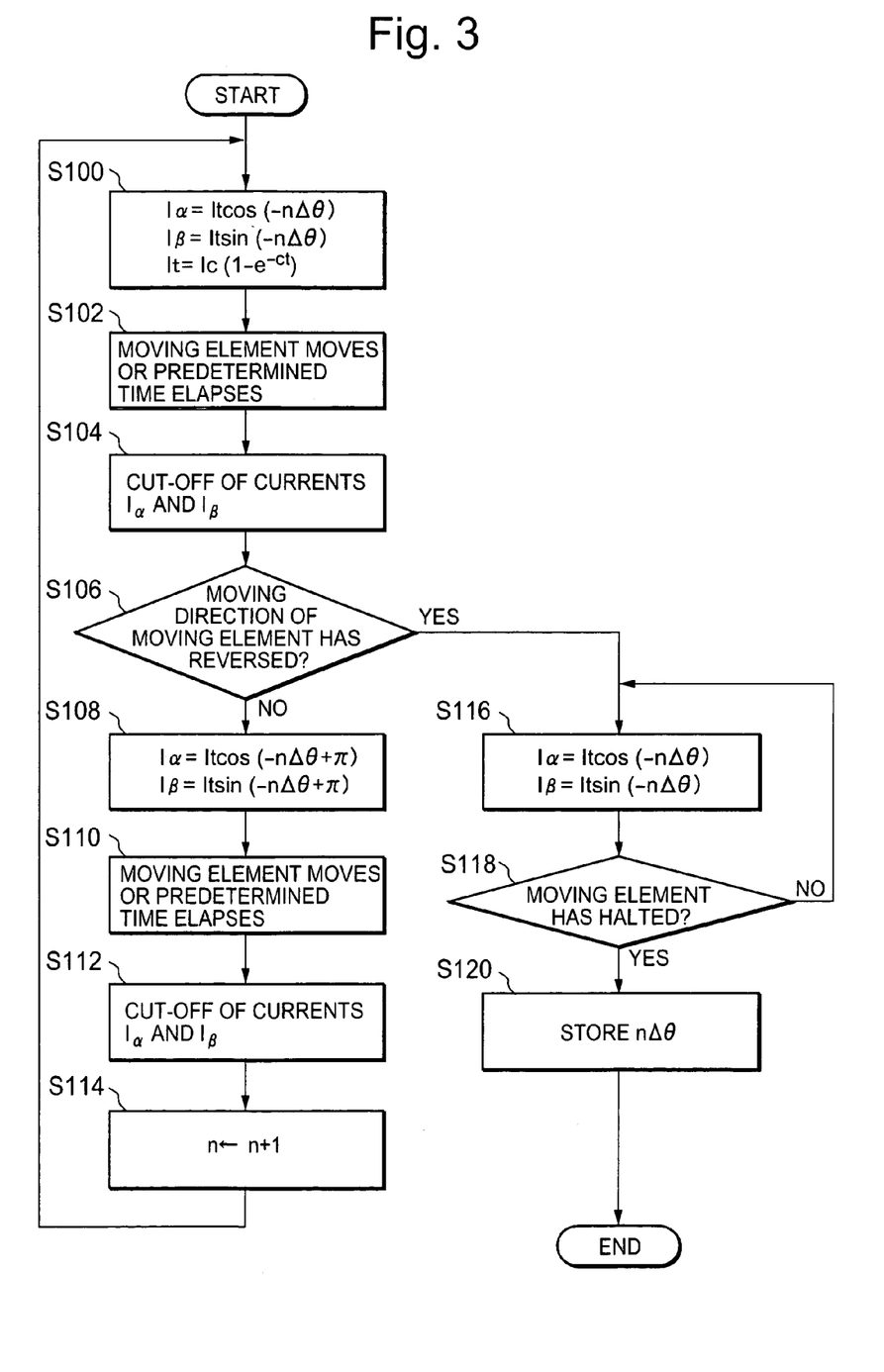
FIG. 3 is a flowchart illustrating operation of the magnetic-pole detecting system for the AC motor illustrated in FIG. 2.

The operation of the magnetic-pole detecting system configured as set forth above is described according to FIG. 1 through FIG. 3.

In a situation wherein the moving element 3 is at a standstill at a position $X_s$ in FIG. 1, when the forward-movement current command signal with the phase of $-\Delta\theta$, and 1 as the number of operations n, is conveyed from the phase-update command unit 52 (to the AC motor 5: in the original draft, this phrase seems to be inserted by mistake) to the current generating unit 30, the current generating unit 30, based on this current command signal and by way of the current control units 32 and 34, makes the currents $I_\alpha$ and $I_\beta$ with the phase of $-\Delta\theta$ to flow in the coils 3a and 3b of the moving element 3, so that an attractive force $F_1$ is exerted (Step S100, the first step). In this way, the moving element 3 gradually starts moving slowly toward the first stable point (Step S102).

When the position detector 10 conveys, as the position-detecting signal, the fact that the moving element 3 has moved, to the CPU 24 by way of the input I/F 22, the movement-determining unit 62 detects that the moving element 3 has moved, and conveys a determination signal to the current cut-off command unit 54. The current cut-off command unit 54 conveys to the current generating unit 30 the current cut-off command signal that cuts off the currents $I_\alpha$ and $I_\beta$ flowing in the coils 3a and 3b, and then the current generating unit 30 immediately cuts off, by way of the current control units 32 and 34, the currents flowing in the coils 3a and 3b (Step S104, the second step). When the currents in the coils 3a and 3b are cut off, the moving element 3 decelerates at the natural-deceleration speed determined by its kinetic friction coefficient and the like, inertially moves, and comes to a standstill.

Although the reverse-movement determining unit 64 determines, based on the position-detecting signal from the position detector 10, if the direction of the moving element 3 has reversed (Step S106), since the moving element 3 is moving for the first time, it is not reversing. Next, in order to return the moving element 3 to its initial position by moving it in the opposite direction to that in which it has slightly moved as described above, the reverse-movement command unit 56 conveys a reverse-movement current command signal from phase $-\Delta\theta+\Pi$ to the current generating unit 30, and the current generating unit 30, by way of the current control units 32 and 34, makes currents $I_\alpha$ and $I_\beta$ of phase $-\Delta\theta+\Pi$ flow in the coils 3a and 3b of the moving element 3 (Step S108, the third step). Due to this, the moving element 3 starts moving toward the stable point determined by the currents $I_\alpha$ and $I_\beta$ of phase $-\Delta\theta+\Pi$, and reverses relative to the movement direction of the moving element 3 in Step S100. In addition, in this reverse-movement, the reverse-movement determining unit 64 does not determine that the moving element 3 has reversed. This is because this is a reverse-movement based on the reverse-movement current command signal from the reverse-movement command unit 56.

Upon the reverse-movement, when a position-detecting signal from the position detector 10 is conveyed to the CPU 24 through the input I/F 22, the current cut-off command unit 54 conveys to the current generating unit 30 the current cut-off command signal that cuts off the currents $I_\alpha$ and $I_\beta$, and the current generating unit 30 cuts off, by way of the current control units 32 and 34, the currents flowing in the coils 3a and 3b (S112, the fourth step). The CPU 24 adds +1 to the number of operations n, and sets the new number of operation to "2" (Step S114). When Step S100 is executed through the forward-movement current command signal for the current of phase $-2\Delta\theta$, an attractive force $F_2$ is generated in the moving element 3, and the moving element 3 moves, but does not reverse (Step S102, S104 and S106). Accordingly, the foregoing Steps S108 through 112 are executed, and the number of operations n is incremented by +1 to "3" (Step S114).

When Step S100 is executed through the forward-movement current command signal for the current of phase $-3\Delta\theta$, the current generating unit 30 makes the currents $I_\alpha$ and $I_\beta$ of phase $-3\Delta\theta$ flow in the coils 3a and 3b, so that an attractive force $F_3$ is exerted. The moving element 3 is moved by this attractive force $F_3$ toward the second stable point, and the direction of the moving element 3 reverses (Step S102 and S104, the fifth step).

The reverse-movement determining unit 64, based on a position-detecting signal from the position detector 10, determines that the movement direction of the moving element 3 has reversed between the previous and the present movements, since the positional value of the moving element 3 has changed from increasing to decreasing, and it generates a reverse-movement signal (Step S106, the sixth step); when the reverse-movement signal is conveyed to the stable-point movement command unit 58, the stable-point movement command unit 58 inactivates the current cut-off command unit 54, and generates a current command signal that makes the currents of the reverse-movement phases $-3\Delta\theta$ or $-2\Delta\theta$ flow in the coils 3a and 3b and conveys the current command signal to the current generating unit 30; and the current generating unit 30 makes the currents $I_\alpha$ and $I_\beta$ of phase $-3\Delta\theta$ or $-2\Delta\theta$ flow in the coils 3a and 3b, so that an attractive force is exerted in the moving element 3, and the moving element 3 is made to move to the position $X_2$ (Step S116). Here, the moving element 3 is moved to the stable point for the purpose of improving detecting accuracy.

Next, the movement-determining unit 62 conveys to the current generating unit 30, as zero, a current command signal (a current cut-off command signal), which is issued by the stable-point movement command unit 58 according to the standstill signal by which it is determined, based on the position-detecting signal from the position detector 10, that the moving element 3 has halted. The current generating unit 30 cuts off the currents flowing in the coils 3a and 3b (Step S118); in Step S116, by making the currents $I_\alpha$ and $I_\beta$, of phase $-3\Delta\theta$ ($-2\Delta\theta$), to flow in the coils 3a and 3b, the magnetic-pole positions of the moving element 3 are stored in a RAM 48 as $3\Delta\theta$ ($2\Delta\theta$) and the step is completed (Step S120). Thus, the AC motor 5 is driven with the phase $3\Delta\theta$ ($2\Delta\theta$), which has been stored in the RAM 27, shifted by $\Pi/2$.

Moreover, although the above embodiment has been described based on the premise that the position where the attractive force F generated in the moving element 3 is zero (a stable point) does not coincide with the standstill position of the moving element 3, on rare occasions the position where the attractive force F of the moving element 3 is zero coincides with the standstill position of the moving element 3. That is to say, the moving element 3 may be present at the position $X_c$ as shown in FIG. 1.

Since, when the moving element 3 is at a standstill in this type of position $X_c$, the moving element 3 is not moved by the attractive force $F_2$, the current cut-off command unit 54 generates a current cut-off command signal after a predetermined time period has elapsed from the issuance of the current command signal, and conveys it to the current generating unit 30 (Step S102 and S110), and then the current generating unit 30 immediately cuts off the currents flowing in the coils 3a and 3b by way of the current control units 32 and 34 (Step S104 and S112). Consequently, in Step S114, the number of operations n is incremented by one to "3," and currents of phase −3Δθ are made to flow, by the phase-update command unit 52, in the coils 3a and 3b, so that the moving element 3 moves in a reverse direction (Step S100 through S104). In Step S106, the reverse-movement determining unit 64 determines reverse-movement according to the previous and the current travel directions of the moving element 3; however, since the moving element was at a halt at the previous instance, there is no previous movement direction. Therefore, using the movement direction of the previous instance when the moving element 3 was at a standstill, i.e., the immediate previous movement direction as the previous movement direction, together with the current movement direction, reverse-movement is determined, and a reverse-movement signal is generated.

Moreover, in the above embodiment, the stable-point movement command unit 58 generates in the coils 3a and 3b a reverse-movement current command signal that results in the current of phase −nΔθ, which is the phase at reverse-movement, and conveys it to the current generating unit 30; and a command is issued to the phase-update command unit 52 to keep generating the reverse-movement current command signal until it is determined, based on the position-detecting signal from the position detector 10, that the moving element 3 has come to a standstill, so that the moving element 3 is moved to a stable point. However, instead of the stable-point movement command unit 58, by using a stable-point simulation unit, which simulates the position of the moving element by the stable point determined by the phase −3Δθ of the currents that had been flowing in the moving element 3 when the reverse-movement determining unit 64 detected a reverse-movement, or by the phase −2Δθ of the currents that are one step prior to the currents upon the reversal, the magnetic-pole detecting system 1 may be configured more simply.

EMBODIMENT 2

Figure 4:
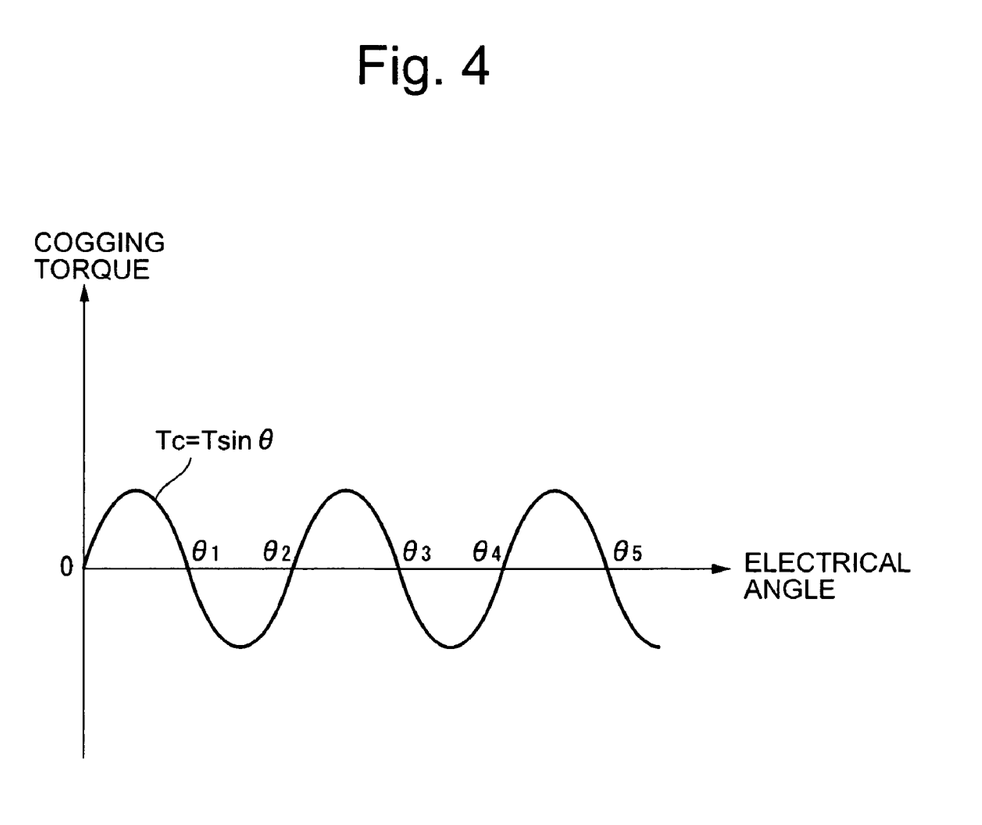
FIG. 4 is a curve chart representing a relationship between cogging torque waveform and a stable point for an AC motor according to another embodiment of the present invention.

Another embodiment of the present invention will be described, mainly according to FIG. 4. The foregoing embodiment was described ignoring the influence of cogging torque that originates in the AC motor 5; however, in fact, sinusoidal cogging torque $T_c$ occurs as shown in FIG. 4. Therefore, in the present embodiment, a highly accurate magnetic-pole detecting system that is unsusceptible to the cogging torque $T_c$ is set forth.

It is known that the maximal value of the sinusoidal cogging torque $T_c$ occurs m times over a range of 2Π in terms of electrical angle of the moving element 3, wherein m is the least-common multiple of the number of slots in the stator 2 and double the number of pole-pairs Pt.

In this situation, for example, if the stator 2 has 12 slots and 8 poles, this least common multiple m is 24; therefore, positive or negative peak values of the cogging torque $T_c$ occur every 15 degrees, and the cogging torque $T_c$ becomes zero every 7.5 degrees as given by electrical angles θ1, θ2 (2θ1), θ3 (3θ1).

Here, the electrical angles θ1, θ2, θ3 may be generalized and represented as in the following relationship: electrical angle $θ_n=n_cθ1$ ($n_c$: a positive integer).

Accordingly, the influence of the cogging torque can be lessened by setting the phase nΔθ of the current command issued by the phase-update command unit 52, as in the foregoing case for example, to 7.5 degrees as an electrical angle (phase) at which the cogging torque is diminished, or preferably is zero.

EMBODIMENT 3

Embodiments 1 and 2 above described the detection of positions of the moving element 3, ignoring the influence of friction. However, in reality, since friction exists when the moving element 3 moves, the stable point of the moving element 3 differs from its standstill position. In order to reduce the influence of this type of friction, a means is available for increasing the currents flowing in the coils 3a and 3b of the moving element 3 so that the attractive force of the moving element 3 is increased, but such a means is not appropriate since, when the currents flowing are increased, the rated current of semiconductor devices forming the current generating unit 30 increases.

Figure 5:
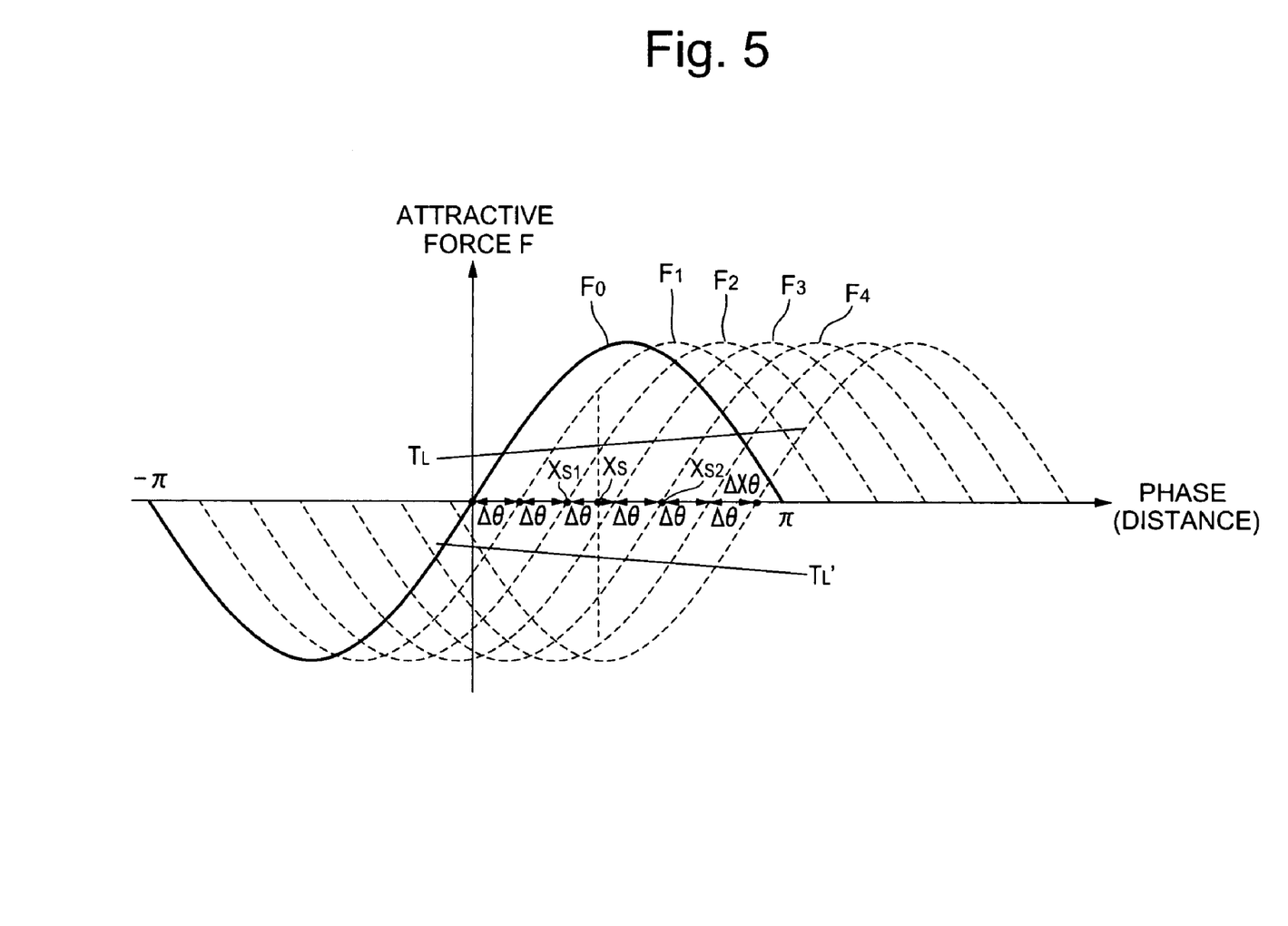
FIG. 5 is a characteristic curve chart representing attractive torque and static-friction torque vs. phase (distance) for the moving element according to another embodiment of the present invention.

Therefore, a magnetic-pole detecting system is set forth according to FIG. 5, wherein the accuracy of detecting the magnetic-pole positions of the moving element 3 is raised without increasing the currents that flow in the coils 3a and 3b. FIG. 5 is a characteristic curve chart representing the attractive torque TL and the static-friction torque TL' vs. the phase (distance), of the moving element 3.

In FIG. 5, assuming that the moving element 3 is at a standstill in the position $X_s$, the moving element 3 is moved in the forward direction by attractive forces $F_0$ and $F_1$; in contrast, under attractive force $F_2$, the moving element 3 remains still since no acceleration torque on the moving element 3 is caused.

In this situation, the first position $X_{s1}$ (the first stable point), as a standstill starting point whereat the attractive force $F_1$ is zero, is obtained based on the phases nΔθ of the currents flowing in the coils 3a and 3b that are necessary for the attractive force $F_1$ to occur. In other words, in the above equation (3), assuming that the travel distance $ΔX_{max}$ is equal to the distance $ΔX_θ$ in the phase Δθ, the first position $X_{S1}$ of the moving element 3 is obtained from the following equation:

$$X_{s1}=τ(Π/2-nΔθ)/2Π \quad (8)$$

Next, as described in Embodiment 1, the phase Δθ of the currents is sequentially updated by the phase-update command unit 52, so that the moving element 3 is reversed by the attractive force $F_4$. Based on the phase of the currents at this reversal, the second position $X_{s2}$ (the second stable point) can be obtained from the above equation (8) in the same way as the position $X_{s1}$ described above. With the positions $X_{s1}$ and $X_{s2}$ obtained in this way, the stable point $X_s$ of the moving element 3 is approximately obtained from the following equation:

$$X_s≈X_{s0}=(X_{s1}+X_{s2})/2 \quad (9)$$

Figure 6:
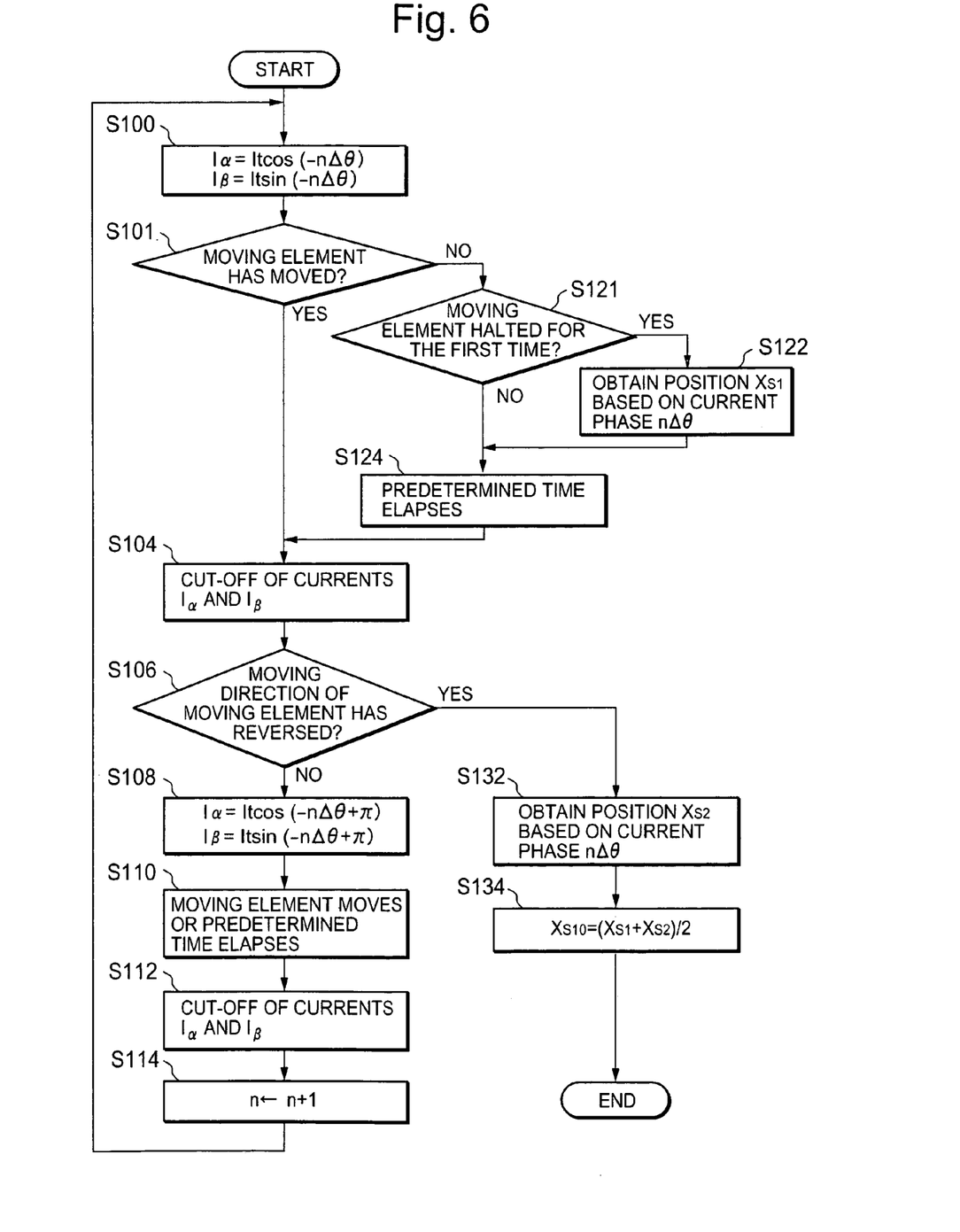
FIG. 6 is a flowchart illustrating the operation of detecting a stable point taking into account the static-friction torque as represented in FIG. 5.

The operation of detecting, by means of a magnetic-pole detecting system, the stable point $X_{s0}$ that is the position of the moving element 3, as described above, will be explained according to flowcharts in FIGS. 2, 5 and 6. In FIG. 6, numerical references identical to those in FIG. 3 denote identical or corresponding operations, and the explanation therefor will be omitted.

In the situation where the moving element 3 is at a standstill in the position $X_s$ in FIG. 5, the current generating unit 30, based on a forward-movement-current command signal, with phase −Δθ, from the phase-update command unit 52, makes currents flow in the coils 3a and 3b by way of the current control unit 32 and 34 (Step S100); an attractive force $F_1$ occurs in the moving element 3, and the moving element 3 is activated (Step S101); Steps S104 through S112 are carried out, and n is set to 2 by adding 1 to the number of operations (Step S114).

The current generating section 30, by means of a forward-movement current command signal from phase $-2\Delta\theta$ from the phase-update command section 52, causes currents to flow in the coils 3a and 3b by way of the current control units 32 and 34 (Step S100); an attractive force $F_2$ acts on the moving element 3; however, the moving element 3 does not move since the attractive force $F_2$ is less than the static-friction torque TL (Step S101). The moving element 3 comes to the first standstill by means of the forward-movement-current command signal (Step S121); the CPU 24 obtains the first position $X_{s1}$, according to the above equation (8) with a phase $-2\Delta\theta$, i.e., by executing the first position-calculating means; and stores it in the RAM 27 (Step S122). The current generating unit 30 cuts off the currents flowing based on a current cut-off command signal from the current cut-off command unit 54 (Steps S124 and S104), when the currents continue to flow in the coils 3a and 3b for more than a predetermined time period. Steps S106 through S112 are carried out, and n is set to 3 by adding 1 to the number of operations (Step S114).

When the above Step S100 is carried out and the currents of phase $-3\Delta\theta$ flow in the coils 3a and 3b (Step S100), the attractive force $F_3$ occurs in the moving element 3; however, the moving element 3 remains still since the attractive force $F_2$ is less than the static-friction torque TL' (Step S101). Since the halting of the moving element 3 is one based on the current-phase update with the forward-movement-current command signal, it is not the first halting (Step S121). Accordingly, Steps S124 and S104 through S112 are carried out, and n is set to 4 by adding 1 to the number of operations (Step S114).

When the above step S100 is carried out and currents of phase $-4\Delta\theta$ flow in the coils 3a and 3b (Step S100), the attractive force $F_4$, which is larger than the static-friction torque TL', acts on the moving element 3, so that the moving element 3 moves in reverse (Step S101). The currents flowing in the coils 3a and 3b are cut off (Step S104); it is determined if the moving direction of the moving element 3 has reversed (Step S106); since it has reversed, the CPU 24, according to the above equation (8) with a phase $-4\Delta\theta$, i.e., by executing the second position-calculating means, obtains the second position $X_{s2}$ and stores it in the RAM 27 (Step S132); the stable point $X_{s0}$, according to the above equation (9), is obtained (stable-point calculating means) and is regarded as the initial magnetic-pole position of the moving element 3 (Step S134).

Although the above embodiments have described 2-phase synchronous AC motors, the present invention can be applied also to N-phase AC motors. Moreover, although the above embodiments are applied to coil (winding)-moving types, they may also be applied to magnetic-pole-moving types.

INDUSTRIAL APPLICABILITY

As set forth heretofore, magnetic-pole detecting systems for synchronous AC motors and magnetic-pole detecting methods therefor according to the present invention are suited to applications for detecting initial magnetic-pole positions in the synchronous AC motors.

What is claimed is:

1. A magnetic-pole detecting system for a synchronous AC motor, comprising:
    a synchronous AC motor having phase coils either in a moving element or in a stator;
    a position-detecting means for generating a position-detecting signal to detect positional relationship between the moving element and the stator;
    a movement-determining means for generating a movement signal upon determining that the moving element has moved, based on the position-detecting signal from the position-detecting means;
    a current command generating means for generating a first current command signal for making a plurality of different-phase currents flow so that the moving element moves to a plurality of stable points, and for generating a second current command signal that makes currents flow, the currents having a phase that makes the moving element move in reverse to the direction in which the moving element has moved based on the first current command signal;
    a current controlling means for making the currents flow in the phase coils, based on the first and the second current command signals;
    a current cut-off means for cutting off the currents flowing in the each-phase coils, based on the movement signal from the movement-determining means;
    a reversal-determining means for determining, based on a detection value from the position-detecting means, the direction in which the moving, element has moved based on the first current command signal, and for determining that the detected direction has reversed between previous and present instances; and
    a stable-point simulating means for simulating the position of the moving element by means of the stable point determined by the phase of the first current command signal when the reversal-determining means has detected a reversal, or by the phase prior to the phase at the reversal.

2. A magnetic-pole detecting system for a synchronous AC motor according to claim 1, wherein the current phase of the first or the second current command signal is a phase at which sinusoidal cogging torque generated in the synchronous AC motor is approximately zero.

3. A magnetic-pole detecting system for a synchronous AC motor according to claim 1, further comprising:
    a phase-updating means for updating the phase of the first current command signal in steps of $\Delta\theta$;
    a standstill-determining means for generating a standstill signal upon determining that the moving element has come to a standstill, based on the position-detecting signal from the position-detecting means, after the currents are made to flow into the phase coils by the first current command signal;
    a first position-calculating means for obtaining a first position equal to the first stable point, based on the first phase of the first current command signal upon the occurrence of the standstill signal;
    a second position-calculating means for obtaining a second position equal to the second stable point, based on the second phase of the first current command signal when the reversal-determining means has made a determination; and
    a stable-point calculating means for obtaining, based on the first and the second positions, the position of the stable point; wherein
the current controlling means maintains the phase of the movable element when at a standstill, even when the currents are made to flow in the phase coils, according to the first current command signal.

4. A magnetic-pole detecting system for a synchronous AC motor according to claim 1, wherein the currents generated by the current controlling means have a time constant longer than that determined from the resistance component and the inductance component of the AC motor.

5. A magnetic-pole detecting system for a synchronous AC motor according to claim 1, further comprising: a cut-off signal generating means for generating a current cut-off command signal when a predetermined time period elapses from the occurrence of the first or the second current command signal; wherein the current cut-off means cuts off the currents in phase coils, based on the current cut-off command signal from the cut-off signal generating means.

6. A magnetic-pole detecting system for a synchronous AC motor according to claim 5, wherein the current phase of the first or the second current command signal is a phase at which sinusoidal cogging torque generated in the synchronous AC motor is approximately zero.

7. A magnetic-pole detecting system for a synchronous AC motor according to claim 5, further comprising:
a phase-updating means for updating the phase of the first current command signal in steps of $\Delta\theta$;
a standstill-determining means for generating a standstill signal upon determining that the moving element has come to a standstill, based on the position-detecting signal from the position-detecting means, after the currents are made to flow into the phase coils by the first current command signal;
a first position-calculating means for obtaining a first position equal to the first stable point, based on the first phase of the first current command signal upon the occurrence of the standstill signal;
a second position-calculating means for obtaining a second position equal to the second stable point, based on the second phase of the first current command signal when the reversal-determining means has made a determination; and
a stable-point calculating means for obtaining, based on the first and the second positions, the position of the stable point; wherein
the current controlling means maintains the phase of the movable element when at a standstill, even when the currents are made to flow in the phase coils, according to the first current command signal.

8. A magnetic-pole detecting system for a synchronous AC motor according to claim 5, wherein the currents generated by the current controlling means have a time constant longer than that determined from the resistance component and the inductance component of the AC motor.

9. A magnetic-pole detecting system for a synchronous AC motor, comprising:
a synchronous AC motor having phase coils either in a moving element or in a stator;
a position-detecting means for generating a position-detecting signal to detect positional relationship between the moving element 25 and the stator;
a movement-determining means for generating a movement signal upon determining that the moving element has moved, based on the position-detecting signal from the position-detecting means;
a current command generating means for generating a first current command signal for making a plurality of different-phase currents flow so that the moving element moves to a plurality of stable points, and for generating a second current command signal that makes currents flow, the currents having a phase that makes the moving element move in reverse to the direction in which the moving element has moved based on the first current command signal;
a current controlling means for mating-the currents flow in the phase coils, based on the first and the second current command signals;
a current cut-off means for cutting off the currents flowing in the each-phase coils, based on the movement signal from the movement-determining means;
a reversal-determining means for determining, based on a detection value from the position-detecting means, the direction in which the moving element has moved based on the first current command signal, and for determining that the detected direction has reversed between previous and present instances; and
a current-maintaining means for inactivating the current cut-off means based on the determination, by the reversal-determining means, that the reversal has occurred, and for continuing to make the currents with the phase at the reversal or currents with the phase prior to the phase at the reversal flow into the phase coils, until the moving element is determined, based on the detecting signal from the position-detecting means, to have come to a standstill.

10. A magnetic-pole detecting system for a synchronous AC motor according to claim 9, wherein the current phase of the first or the second current command signal is a phase at which sinusoidal cogging torque generated in the synchronous AC motor is approximately zero.

11. A magnetic-pole detecting system for a synchronous AC motor according to claim 9, further comprising:
a phase-updating means for updating the phase of the first current command signal in steps of $\Delta\theta$;
a standstill-determining means for generating a standstill signal upon determining that the moving element has come to a standstill, based on the position-detecting signal from the position-detecting means, after the currents are made to flow into the phase coils by the first current command signal;
a first position-calculating means for obtaining a first position equal to the first stable point, based on the first phase of the first current command signal upon the occurrence of the standstill signal;
a second position-calculating means for obtaining a second position equal to the second stable point, based on the second phase of the first current command signal when the reversal-determining means has made a determination; and
a stable-point calculating means for obtaining, based on the first and the second positions, the position of the stable point; wherein
the current controlling means maintains the phase of the movable element when at a standstill, even when the currents are made to flow in the phase coils, according to the first current command signal.

12. A magnetic-pole detecting system for a synchronous AC motor according to claim 9, wherein the currents generated by the current controlling means have a time constant longer than that determined from the resistance component and the inductance component of the AC motor.

13. A magnetic-pole position detecting method for a synchronous AC motor having phase coils either in a moving element or in a stator, a position-detecting means for generating a position-detecting signal to detect positional relationship between the moving element and the stator, a current-command generating means for generating a first current command signal that makes a plurality of different-phase currents flow so that the moving element moves to a plurality of stable points, and for generating a second current command signal that makes currents flow, the currents having a phase that makes the moving element move in reverse to the direction in which the moving element has moved based on the first current command signal, a current controlling means for making the currents flow in the coils of each phase, based on the first and the second current command signals, the method comprising:
- a first step of making, by means of the current control means, currents with a first phase flow in the phase coils, so that the moving element moves, based on the first current command signal, to a first stable point;
- a second step of cutting off the currents by means of a current cut-off means, when a movement-determining means detects, based on the position-detecting signal, a movement of the moving element;
- a third step of making, based on the second current command signal, currents with a second phase flow in the phase coils, by means of the current controlling means, so that the moving element reverses from a direction in which the moving element has moved;
- a fourth step of cutting off the currents by means of the current cut-off means when the movement of the moving element is detected by the movement-determining means;
- a fifth step of changing the phase of the first current command signal to the phase for a second stable point that is different from the phase for the first stable point, and of making the currents flow in the phase coils by means of the current controlling means;
- a sixth step of determining, based on the position-detecting signal from the position-detecting means, a direction in which the moving element moves based on the first current command signal, and of determining whether or not the detected direction has reversed between the previous and the present instances; wherein the first step through the sixth step are sequentially carried out, and the stable point determined by the phase of the first current command signal when the reversal-determining means has detected a reversal, or by the phase prior to the phase at the reversal is simulated as the position of the moving element by a stable-point simulating means.

14. A magnetic-pole position detecting method for a synchronous AC motor according to claim 13, wherein the current phase of the first or the second current command signal is a phase at which sinusoidal cogging torque generated in the synchronous AC motor is approximately zero.

15. A magnetic-pole position detecting method for a synchronous AC motor according to claim 13, wherein the currents generated by the current controlling means have a time constant longer than that determined from the resistance component and the inductance component of the AC motor.

* * * * *